United States Patent
Matsumoto et al.

(10) Patent No.: US 6,950,165 B2
(45) Date of Patent: Sep. 27, 2005

(54) IN-PLANE SWITCHING MODE LIQUID CRYSTAL DISPLAY DEVICE

(75) Inventors: Kimikazu Matsumoto, Tokyo (JP);
Kunimasa Itakura, Tokyo (JP);
Shinichi Nishida, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/397,256

(22) Filed: Mar. 27, 2003

(65) Prior Publication Data

US 2003/0184699 A1 Oct. 2, 2003

(30) Foreign Application Priority Data

Mar. 29, 2002 (JP) ........................................ 2002-096006

(51) Int. Cl.⁷ ........................ G02F 1/136; G02F 1/1343
(52) U.S. Cl. ........................................ 349/141; 349/44
(58) Field of Search ................................. 349/44, 141

(56) References Cited

U.S. PATENT DOCUMENTS

| | | | | |
|---|---|---|---|---|
| 5,414,547 A | * | 5/1995 | Matsuo et al. | 349/44 |
| 6,069,678 A | * | 5/2000 | Sakamoto et al. | 349/141 |
| 6,091,473 A | * | 7/2000 | Hebiguchi | 349/141 |
| 6,650,389 B1 | * | 11/2003 | Sakamoto | 349/141 |

FOREIGN PATENT DOCUMENTS

| | | | | |
|---|---|---|---|---|
| JP | 6-202127 | 7/1994 | | |
| JP | 9-318972 | 12/1997 | | |
| JP | 2000180898 A | * | 6/2000 | ......... G02F/1/1365 |
| KR | 1998-033299 | 7/1998 | | |
| KR | 2000-0023135 | 4/2000 | | |

OTHER PUBLICATIONS

Chinese Office Action dated Jun. 18, 2004, with English translation.

* cited by examiner

*Primary Examiner*—Huyen Ngo
(74) *Attorney, Agent, or Firm*—McGinn & Gibb, PLLC

(57) ABSTRACT

An in-plane switching mode liquid crystal display device includes a substrate, a scanning line formed on the substrate, a data line formed above the substrate to cross the scanning line while interposing an insulation film between the data line and the scanning line, and a transparent common electrode interconnect line located farther the substrate than the scanning line and the data line and having a width longer than those of the scanning line and the data line, and further, formed to geometrically cover the scanning line and the data line. The construction of the device makes it possible to make all electric fields from the data line and the scanning line terminate on the common electrode interconnect line. Forming the common electrode interconnect line with a transparent conductive material maintains the aperture ratio of the device.

6 Claims, 15 Drawing Sheets

- RUBBING DIRECTION
- 227 PIXEL ELECTRODE (ITO)
- 226 COMMON ELECTRODE INTERCONNECT LINE (ITO)

226 COMMON ELECTRODE INTERCONNECT LINE (ITO)

227 PIXEL ELECTRODE (ITO)

RUBBING DIRECTION

227 PIXEL ELECTRODE (ITO)
226 COMMON ELECTRODE INTERCONNECT LINE (ITO)

126 COMMON ELECTRODE INTERCONNECT LINE (Cr)
227 PIXEL ELECTRODE (ITO)
226 COMMON ELECTRODE INTERCONNECT LINE (ITO)

RUBBING DIRECTION

24

227 PIXEL ELECTRODE (ITO)

226 COMMON ELECTRODE INTERCONNECT LINE (ITO)

30
626
35
28

126 COMMON ELECTRODE INTERCONNECT LINE (Cr)

226 COMMON ELECTRODE INTERCONNECT LINE (ITO)

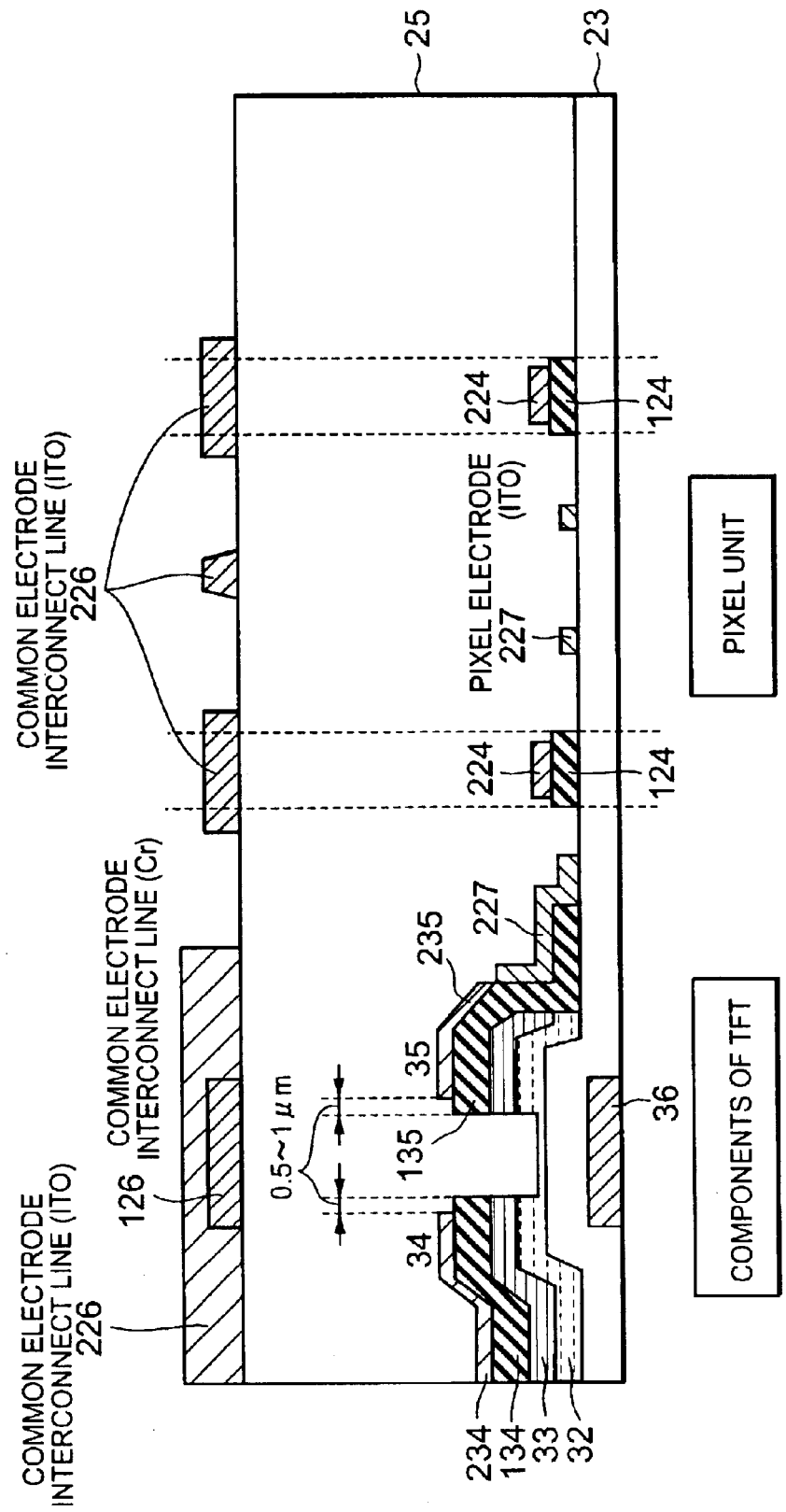

IN-PLANE SWITCHING MODE LIQUID CRYSTAL DISPLAY DEVICE

BACKGROUND OF THE INVENTION

1. Field of the Invention

The present invention relates to a liquid crystal display device, and particularly to an In-Plane Switching (IPS) mode liquid crystal display device.

2. Description of the Related Art

There are two primary types of liquid crystal display devices. One of the two primary devices displays an image by making the major axis (the direction of the axis is referred to as "director") of a liquid crystal molecule rotate in a plane orthogonal to a substrate. In contrast, the other displays an image by making the major axis of a liquid crystal molecule rotate in a plane parallel to a substrate.

The former is typified by a Twisted Nematic (TN) liquid crystal display device and the latter is typified by an IPS liquid crystal display device.

The IPS liquid crystal display device is characterized in that even when a viewer views an image on a display of the device from directions different in relation to the device, since the viewer views liquid crystal molecules only in a direction along the minor axis of the molecule, the viewer is able to view the image regardless of whether a liquid crystal molecule stands up or lies down in relation to a substrate, achieving viewing angle wider than that observed using a TN liquid crystal display device.

This is why an IPS liquid crystal display device has been used more prevalently than a TN liquid crystal display device in recent years.

For instance, Japanese Patent Application Laid-open No. 6(1994)-202127 (hereinafter, referred to as a first conventional technique) and Japanese Patent Application Laid-open No. 9(1997)-318972 (hereinafter, referred to as a second conventional technique) disclose a technique for increasing the aperture ratio of IPS liquid crystal display device.

The IPS liquid crystal display device disclosed in the first conventional technique has driving means consisting of an active matrix and is characterized in that the most part of a portion, facing a liquid crystal layer, of a signal interconnect line used to transmit an image signal to the active matrix is covered via an insulation layer by a conductor. However, embodiments employed in the first conventional technique never give indication of a configuration to make a transparent electrode shield a signal line from unfavorable electric field leakage.

The IPS liquid crystal display device disclosed in the second conventional technique has a component serving both as a common electrode interconnect line and a black matrix (in other words, a common electrode interconnect line serving also as a black matrix or vice versa), and further, a scanning line and a data line, both of which are completely covered by the common electrode interconnect line serving also as a black matrix. The second conventional technique is intended to make the common electrode interconnect line simultaneously serve as a conductor and a shielding film and never gives indication of a configuration to make a transparent electrode prevent electric field leakage from a scanning line and a data line.

Both the IPS liquid crystal display devices disclosed in those conventional techniques are intended to make the aperture ratio of the device and increase brightness of an image to be displayed.

Since a potential difference exists between the data line and the common electrode and between the scanning line and the common electrode, an unfavorable electric field is generated by the potential difference. When the electric field reaches a display region between a pixel electrode and the common electrode, liquid crystal molecules included in the corresponding region the unfavorable electric field reaches are affected by the unfavorable electric field and then are abnormally aligned. For example, when a white window having a black background appears on a screen, pixels displaying black and corresponding to a data line transmitting an image signal by which corresponding pixels are driven to display white are forced to have a gray scale level, which phenomenon is a display problem called "longitudinal cross-talk."

To prevent this problem, dummy common electrodes provided on both sides of the data line and the scanning line are made to have a wide width and electric fields from the data line and the scanning line are made to terminate on the dummy common electrodes, i.e., electric field leakage from the data line and the scanning line is prevented, or the data line and the scanning line are covered by electrodes such as a common electrode at a voltage potential that does not affect an image to be displayed.

In order to increase the aperture ratio of liquid crystal display device, as is shown in the latter case, it is preferable to form a common electrode to cover a data line and a scanning line.

However, when employing the conventional technique, since a common electrode is formed of a shielding film, an extent to which light beams are utilized in the device unfavorably decreases.

The reason why a common electrode is formed of a shielding film is that display through around a boundary between pixels is affected by light leaking from the pixel next to the boundary. To prevent the unfavorable phenomenon, typically, a black matrix made from a shielding film is formed around a boundary between pixels. Then, the inventors of the application performed simulations and experiments, and determined an extent to which light beams leaking from the pixel next to the boundary affect display through around the boundary between pixels, leading to the conclusion that when electric field leakage from the scanning line and the data line is completely prevented, an extent to which light beams leaking from the pixel next to the boundary affect display through around the boundary between pixels is small and the black matrix can be removed from the device except for the case where an image to be displayed is required to have high quality.

SUMMARY OF THE INVENTION

The present invention has been conceived based on the above-stated simulations and experiments, and is directed to an in-plane switching mode liquid crystal display device capable of preventing occurrence of longitudinal cross-talk and increasing the aperture ratio of the device.

The present invention also has been proposed to solve the above-described problems. That is, an in-plane switching mode liquid crystal display device according to the present invention includes: a first substrate having a scanning line, a data line and a common electrode interconnect line formed thereon, in which the data line is formed to cross the scanning line while interposing an insulation film between the data line and the scanning line, the common electrode interconnect line is constructed such that the common electrode interconnect line is located farther the first substrate than the scanning line and the data line, and has a width longer than those of the scanning line and the data line in order to geometrically cover the scanning line and the data line. The device of the invention further includes a second substrate disposed to face the first substrate while interposing a liquid crystal between the first and second substrates.

The construction of the device makes it possible to make all electric fields from the data line and the scanning line terminate on the common electrode interconnect line. Forming the common electrode interconnect line with a transparent conductive material maintains the aperture ratio of the conventional device.

BRIEF DESCRIPTION OF THE DRAWINGS

FIG. 10 is a cross sectional view taken along the lines I—I, II—II shown in FIG. 1A and corresponds to the case where the data line and a part of the common electrode interconnect line have a laminated structure consisting of an opaque film (chromium) and a transparent film (Indium—Tin—Oxide: ITO);

DETAILED DESCRIPTION OF THE PREFERRED EMBODIMENTS

Embodiments of the present invention will be explained in detail below with reference to the accompanying drawings. Hereinafter, assume that when denoting layers on an active matrix substrate 11 and an opposing substrate 12 respectively, a layer located nearer in relation to a liquid crystal layer 13 than the other layer is referred to as an upper layer and a layer located farther in relation to the liquid crystal layer 13 than the other layer is referred to as a lower layer.

(A First Embodiment of the Present Invention)

Figure 1A:
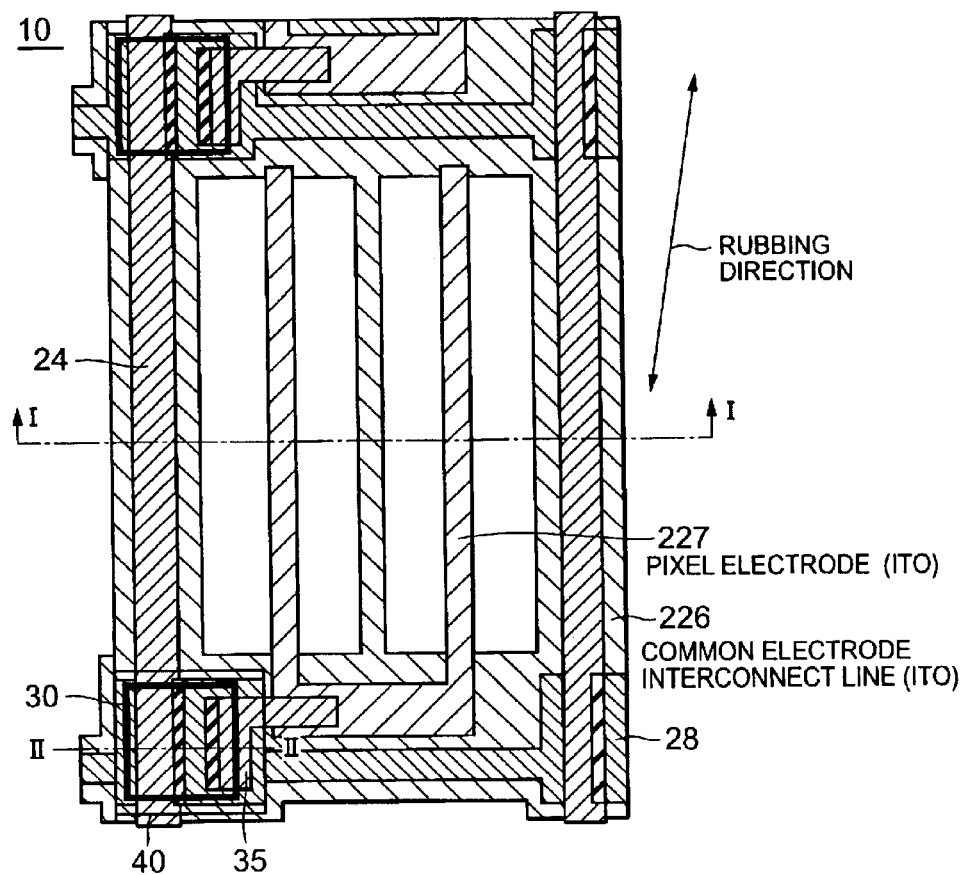
FIG. 1A is a plan view of a liquid crystal display device according to the first embodiment of the present invention.
Figure 1B:
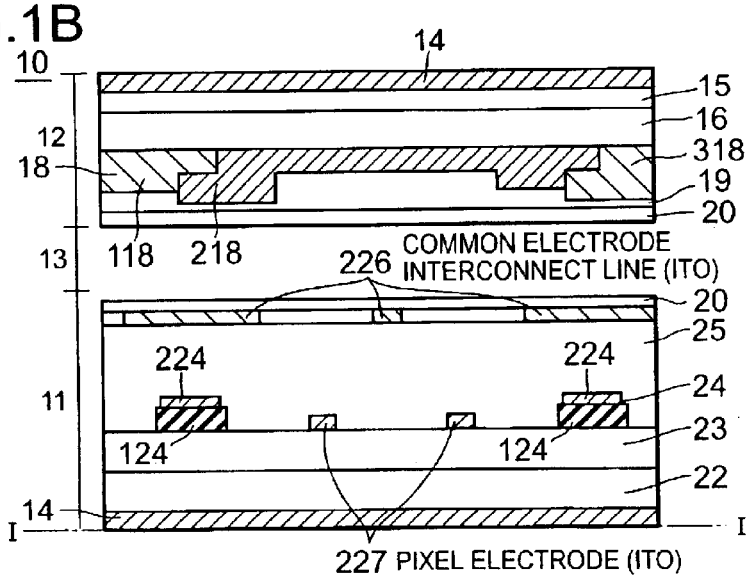
FIG. 1B is a cross sectional view taken along the line I—I of FIG. 1A.
Figure 2:
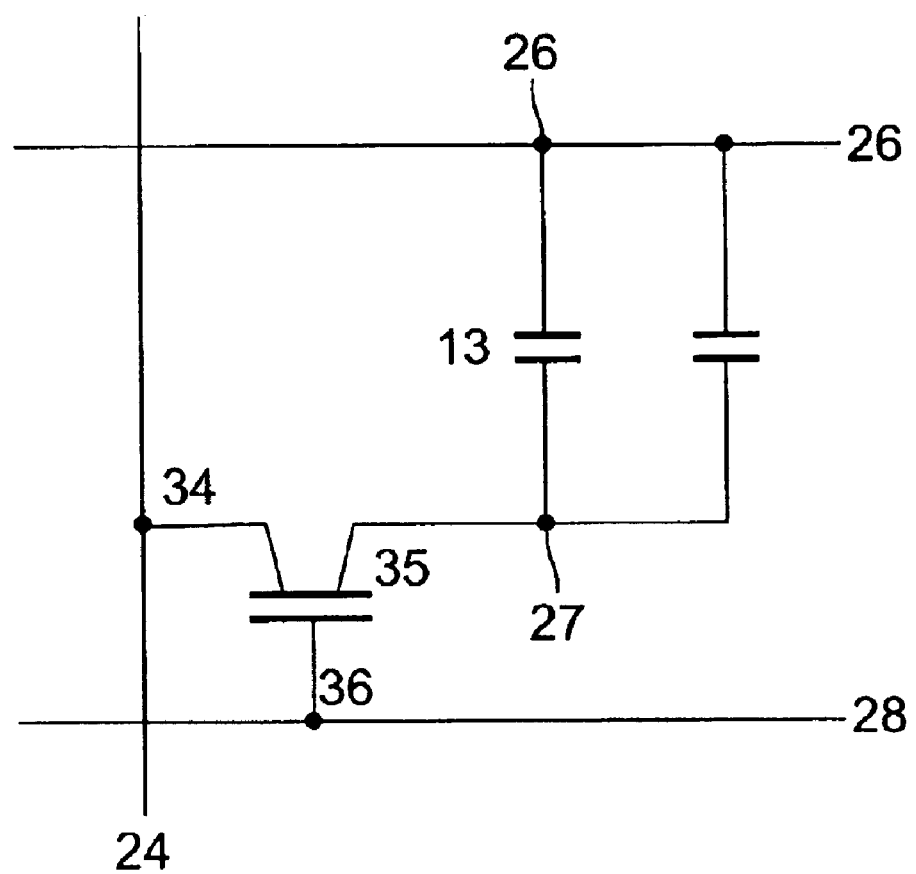
FIG. 2 is a circuit diagram corresponding to a pixel shown in FIG. 1A.

FIGS. 1 and 2 illustrate an in-plane switching mode active matrix liquid crystal display device according to a first embodiment of the present invention. FIG. 1A is a plan view of a liquid crystal display device according to the embodiment and FIG. 1B is a cross sectional view taken along the line I—I, and FIG. 2 is a circuit diagram corresponding to a pixel shown in FIG. 1A.

As shown in FIG. 1B, a liquid crystal display device 10 includes an active matrix substrate 11, an opposing substrate 12 and a liquid crystal layer 13 interposed between the active matrix substrate 11 and the opposing substrate 12.

The opposing substrate 12 includes a second transparent insulation substrate 16, a color layer 18 formed on the substrate 16 and a transparent overcoat layer 19 formed on the color layer 18. Furthermore, in order to prevent electrostatic charges, which are generated by direct friction between a surface of a liquid crystal display panel and an operator, from electrically affecting the liquid crystal layer 13, a transparent conductive layer 15 is formed on a back surface of the second transparent insulation substrate 16. The color layer 18 is constructed such that a red color layer 118 made of a resin consisting of red (R) dye or pigment, a green color layer 218 made of a resin consisting of green (G) dye or pigment and a blue color layer 318 made of a resin consisting of blue (B) dye or pigment are arranged in a periodic fashion. To prevent occurrence of spacing between adjacent color layers even when displacement of a color from another color adjacent thereto occurs, as shown in FIG. 1B, the color layers, each having a color different from the other, adjacent to one another are formed to overlap one another.

The active matrix substrate 11 includes: a first transparent insulation substrate 22; a first metal film formed on the substrate 11 and constituting a scanning line 28 (refer to FIG. 1A) and a gate electrode 36 (refer to FIG. 2); a first interlayer insulation film 23 formed on the first metal film; an island-shaped amorphous silicon film, a data line 24, a source electrode 35 and a drain electrode 34 of a thin film transistor 30 and a pixel electrode made from a transparent film, all of which are formed on the first interlayer insulation film 23; a second interlayer insulation film 25 formed on the first interlayer insulation film 23 and covering those components formed on the first interlayer insulation film 23; and a common line 26 made from a transparent film and formed on the second interlayer insulation film 25. The data line 24 has a laminated structure consisting of an opaque film 124 and a transparent film 224 having a width smaller than that of the opaque film and bonded thereto. The construction of the data line makes it possible to reduce the resistance of the data line and prevent the time delay of a data signal. The reason why the width of the transparent film 224 is made narrower than that of the opaque film 124 is as follows. That is, when the transparent film 224 is formed by etching a portion of a transparent film deposited over the surface of the substrate, which portion is not covered by a resist pattern, and the data line is exposed to the outside, a voltage potential difference is generated between the transparent film made of, for example, ITO and the opaque film made of, for example, chromium owing to cell reaction (the reaction is observed when different metals are dipped in an electrolytic solution and the metals are electrically connected to one another, and then, a voltage potential difference is generated therebetween; the reaction is generally called "cell reaction"), and the voltage potential difference makes an opaque pattern to be formed as the data line become easily etched. As a difference between the sizes of the transparent film pattern and the opaque film pattern becomes large, the phenomenon, i.e., cell reaction, is accelerated and in some cases, the opaque film and the transparent film disappear. To prevent the phenomenon and increase the yield of the device, it is preferable to form the opaque film wider by 1 to 2 micrometers than the transparent film.

An alignment film 20 is coated on each of the surfaces of the active matrix substrate 11 and the opposing substrate 12, and the alignment film is rubbed in a direction at an angle of 10 to 30 degrees relative to a direction in which the data line 24 extends in order to make liquid crystal molecules of the liquid crystal layer 13 homogeneously aligned. Then, the two substrates are bonded to one another to face one another. The angle in which the alignment film is rubbed is referred to as an initial alignment direction of liquid crystal molecule.

As shown in FIG. 1A, the active matrix substrate 11 includes: the data line 24 to which a data signal is supplied; a common electrode interconnect line 26 to which a reference voltage potential is supplied; a pixel electrode 27 to which a voltage potential corresponding to a pixel to be displayed is supplied; a scanning line 28 to which a scanning signal is supplied; and a thin film transistor 30. The common electrode interconnect line 26 and the pixel electrode 27 each have portions alternately arranged and when a voltage is applied between the common electrode interconnect line 26 and the pixel electrode 27, an electric field is generated in a direction parallel to the surfaces of the first and second transparent insulation substrates 22 and 16. Both the common electrode interconnect line 26 and the pixel electrode 27 have comb-shaped portions and the comb-shaped portions of the common electrode interconnect line 26 and the comb-shaped portions (in case of the common electrode interconnect line 26, the comb-shaped portions referred to also as sub-electrodes and sub-electrodes of the common electrode interconnect line 26 adjacent to sub-electrodes of the pixel electrode 27 contribute to generating an electric field in cooperation with the sub-electrodes of the pixel electrode 27) of the pixel electrode 27 (in case of the pixel electrode 27, the comb-shaped portions referred to also as sub-electrodes the sub-electrodes of the pixel electrode 27 constitute major part of the pixel electrode 27) are alternately arranged and disposed in parallel with one another. In the liquid crystal display device 10, liquid crystal molecules are driven by an electric field generated between the pixel electrode 27 and the common electrode interconnect line 26. The pixel electrode 27 and the common electrode interconnect line 26, both being used to drive liquid crystal molecules are typically called a pixel electrode and a common electrode, respectively. However, since a common electrode interconnect line serves as both common interconnect line and common electrode, it is difficult to clearly separate the common interconnect line and the common electrode from one another. Accordingly, in the following chapter of this specification, the term "common electrode interconnect line" is used instead of the terms "common interconnect line" and "common electrode."

Furthermore, the common electrode interconnect line 26 made from an opaque film is denoted as an opaque common electrode interconnect line 126 and the common electrode interconnect line 26 made from a transparent film is denoted as a transparent common electrode interconnect line 226.

As shown in FIG. 1A, the data line 24 and the scanning line 28 are geometrically and indirectly covered by the common electrode interconnect line 226 made from a transparent film and having a width larger than those of the data line 24 and the scanning line 28. Constructing as described above the data line 24, the scanning line 28 and the common electrode interconnect line 226 allows an electric field leakage from the scanning line 28 and the data line 24 to completely be prevented. Accordingly, an effective display area, which can be controlled using the pixel electrode and the common electrode interconnect line 226, is enlarged, increasing the aperture ratio of the device. In addition, since the common electrode interconnect line 226 is made from a transparent film, all the geometric area excluding the scanning line 28 and the data line 24 can be made to serve as the aperture of the device.

Furthermore, as shown in FIG. 1A, the common electrode interconnect line 226 made from a transparent film is provided by forming an ITO film in a mesh pattern, allowing the resistance of the interconnect line to be reduced.

As shown in FIG. 1B, forming the common electrode interconnect line 26 and the pixel electrode 27 on different, layers of the active matrix substrate prevents short circuit between the common electrode interconnect line 26 and the pixel electrode 27, increasing the yield of the device. In this case, forming the common electrode interconnect line 26 on a layer nearer the liquid crystal layer 13 than the pixel electrode 27 allows spacing between the common electrode interconnect line 26 and the data line 24, and spacing between the common electrode interconnect line 26 and the scanning line 28 to be enlarged, reducing parasitic capacitance between the common electrode interconnect line 26 and the data line 24, and parasitic capacitance between the common electrode interconnect line 26 and the scanning line 28.

Figure 3A:
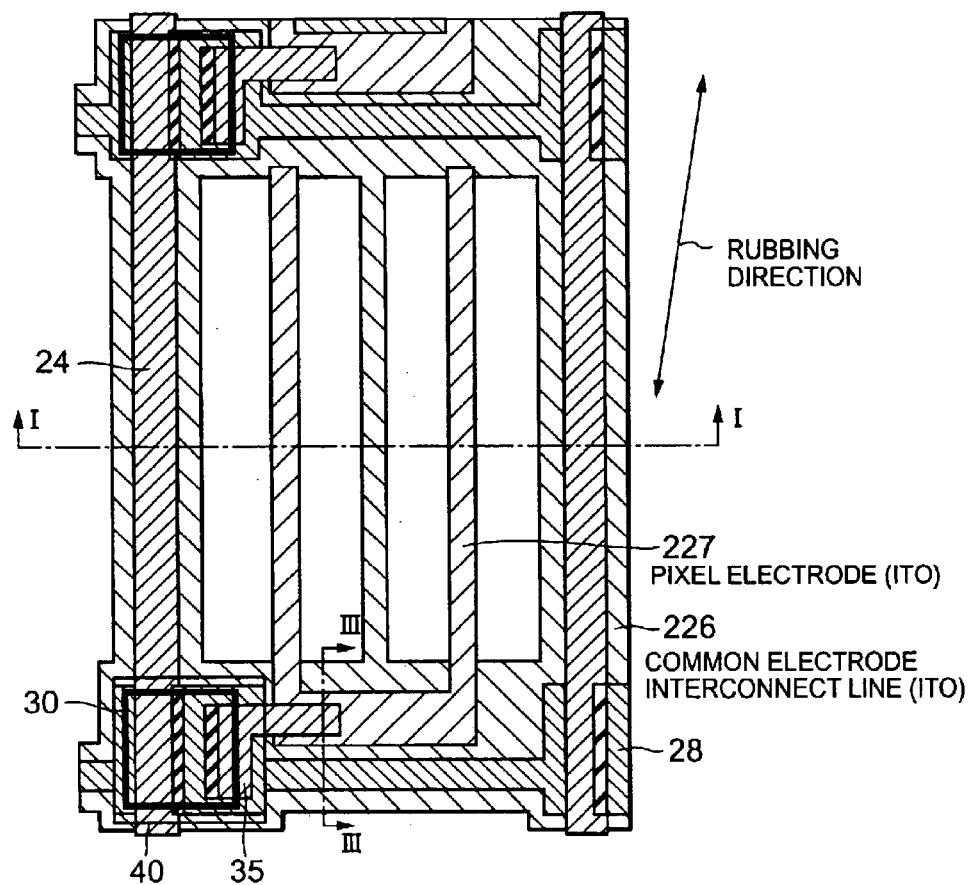
FIG. 3A is a plan view of a liquid crystal display device of the first modification example of the first embodiment of present invention.
Figure 3B:
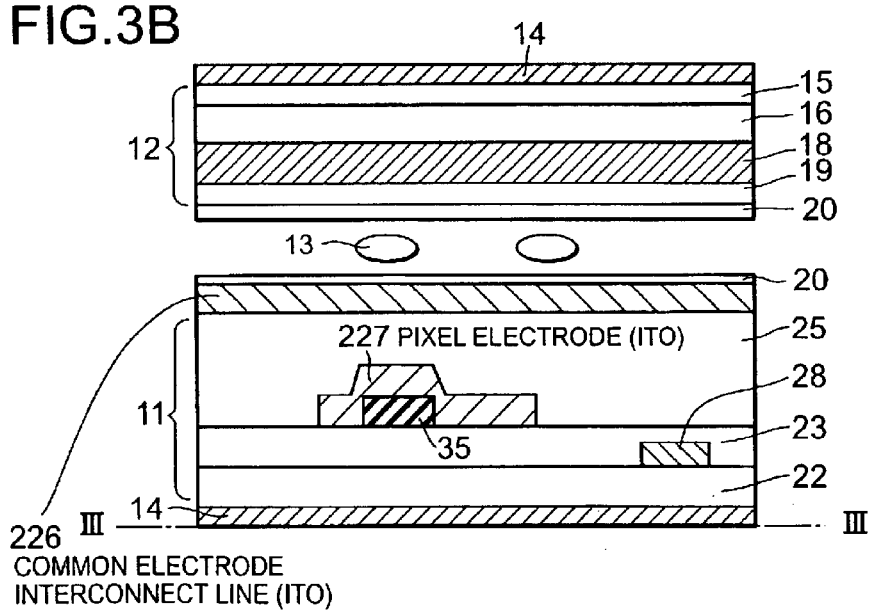
FIG. 3B is a cross sectional view taken along the line III—III shown in FIG. 3A.

As shown in FIG. 3A, a portion of the common electrode interconnect line 26 parallel to a direction, in which the scanning line 28 extends, and a portion of the pixel electrode 27 parallel to a direction, in which the scanning line 28 extends, face one another in upward/downward directions via a second interlayer insulation film 25. The portion of the common electrode interconnect line 26 and the portion of the pixel electrode 27 constructed as described above form an accumulation capacitor connected in parallel with a liquid crystal capacitor, increasing the electrical stability of the device.

Referring again to FIG. 1A, the source electrode 35 and the pixel electrode 227 are formed without interposing an insulation film therebetween, eliminating the need for employment of a contact hole. Accordingly, since a contact hole needs not to be formed in the insulation film, the source electrode needs not to be formed larger for formation of the contact hole, i.e., resistance in connection between the source electrode 35 and the pixel electrode 27 can be reduced without reducing the aperture ratio of the device.

Figure 4A:
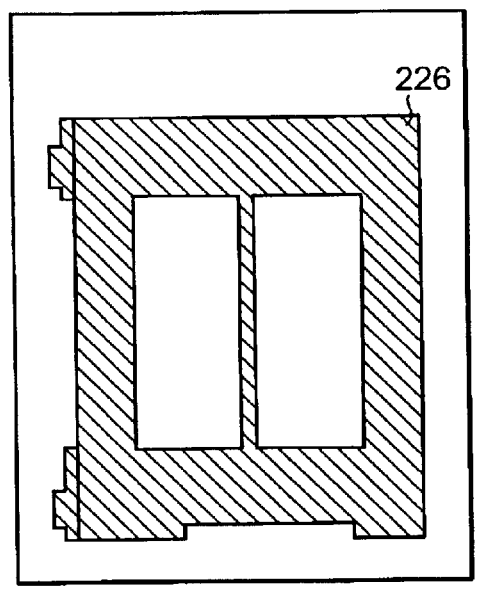
FIG. 4A illustrates a transparent film formed in the uppermost level of the interconnect shown in FIG. 1A and constituting the common electrode interconnect line.
Figure 4B:
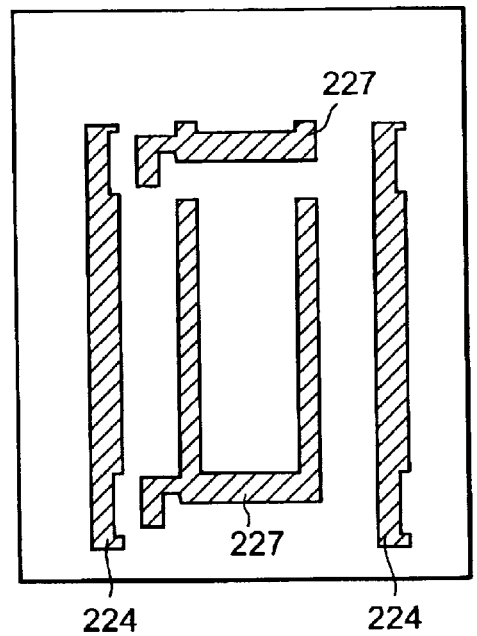
FIG. 4B illustrates a transparent film constituting the pixel electrode and the transparent film of the data line, and formed at the same level as the second metal film.
Figure 4C:
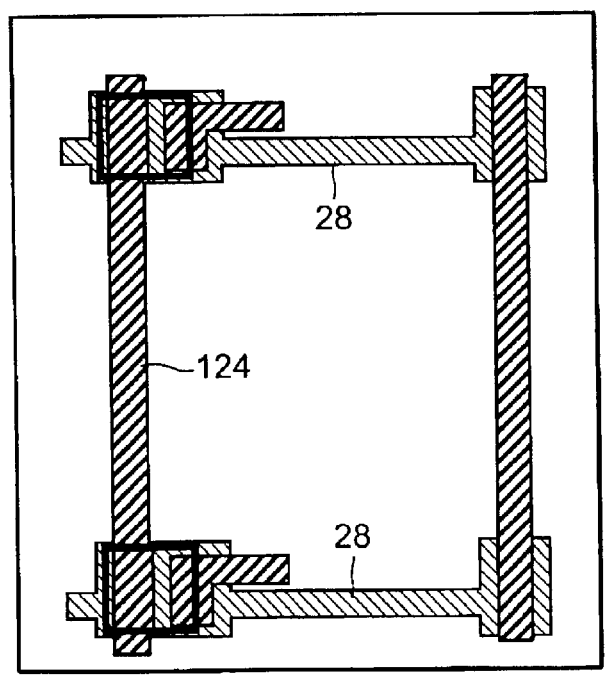
FIG. 4C illustrates conductive films other than shown in FIGS. 4A, 4B.

FIGS. 4A to 4C are plan views produced by dividing the plan view of FIG. 1A into three categories: (1) a transparent (ITO) film formed in the uppermost level of interconnect and constituting the common electrode interconnect line 226 (FIG. 4A); (2) a transparent (ITO) film constituting the pixel electrode 227 and the transparent film 224 of the data line 24 (FIG. 4B); (3) and other films including the first metal film constituting the scanning line 28 and the second metal film constituting the opaque film 124 of the data line 24 (FIG. 4C). The pixel electrode 227 made from a transparent film and the transparent film 224 of a width narrower than that of the opaque film 124, both films constituting the data line, are formed at the same level as the second metal film. That is, the transparent film 224 having a width narrower than that of the opaque film 124 and bonded to the opaque film 124 is formed along with the pixel electrode 227. As shown in FIGS. 1A and 4A to 4C, a light shielding film does not exist geometrically between the common electrode interconnect line 226 made from a transparent film, which completely covers the data line 24 and the scanning line 28, and the pixel electrode 227 formed adjacent to the common electrode interconnect line 226 and made from a transparent film, except for an area in which components of TFT exist. Furthermore, since the pixel electrode 27 is made from a transparent film 227, the aperture ratio of the device increases, improving the usability of light source of the device.

Additionally, as shown in FIG. 1A, a light shielding film 40 (referred to generally as a black matrix) is formed on the second transparent substrate 16 of the opposing substrate 12 so as to geometrically cover at least the components of the TFT, in order to make the TFT maintain its normal switching performance.

In a case where a black matrix is formed in an area other than the area occupied by the components of the TFT and relative displacement between the active matrix substrate 11 and the opposing substrate 12 occurs when the two substrates are bonded to one another, the black matrix 40 unfavorably lowers the aperture ratio of the device.

Figure 5A:
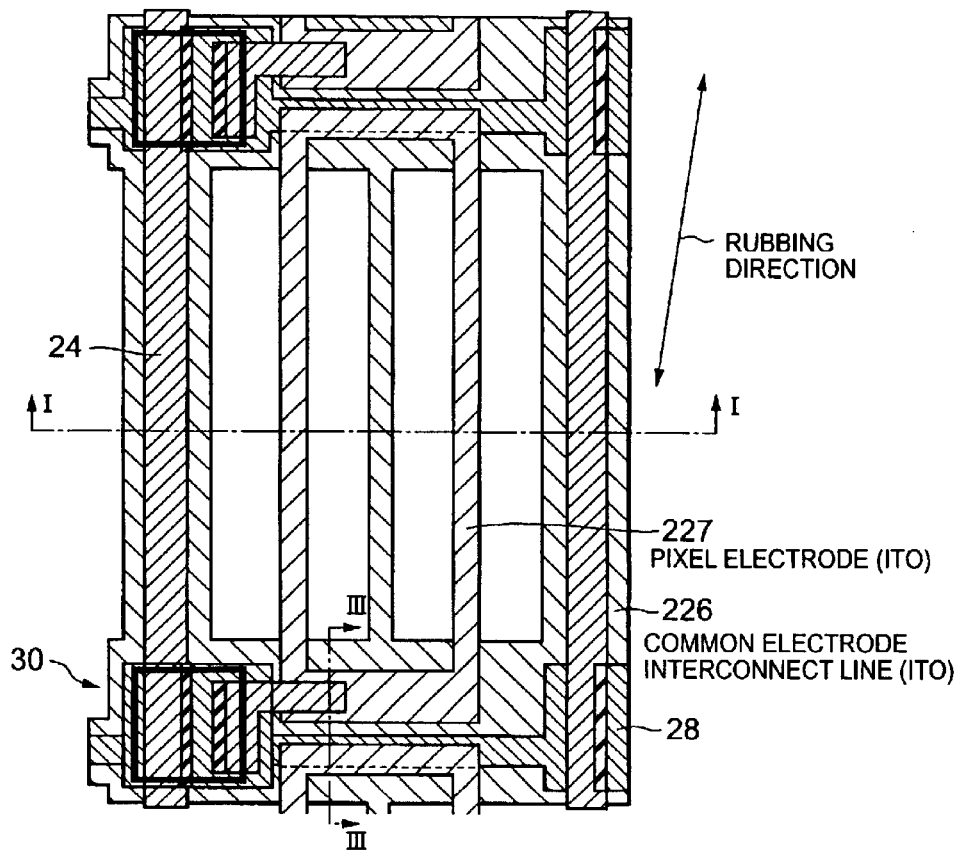
FIG. 5A is a plan view of a liquid crystal display device of the second modification example of the first embodiment of the present invention.
Figure 5B:
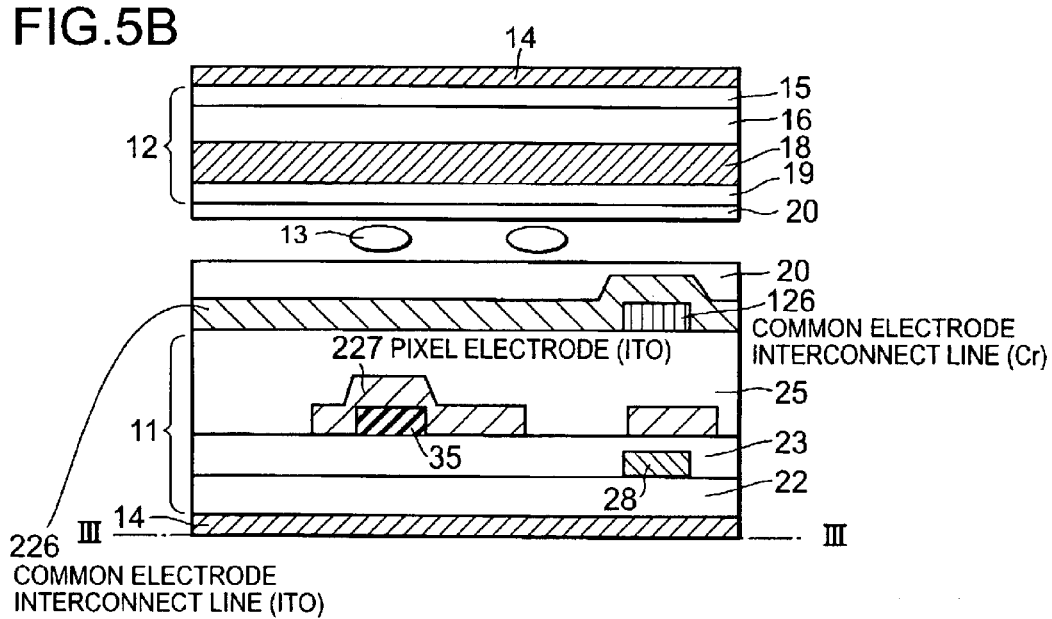
FIG. 5B is a cross sectional view taken along the line III—III shown in FIG. 5A.

Furthermore, FIGS. 5A and 5B illustrate a second modification example of the embodiment shown in FIGS. 1A and 1B. FIG. 5A is a plan view of a liquid crystal display device of the second modification example and FIG. 5B is a cross sectional view taken along the line III—III shown in FIG. 5A. As shown in FIGS. 5A and 5B, the pixel electrode 27 is made to overlap the scanning line 28 via the interlayer insulation film 23 in order to add accumulation capacitance to the corresponding pixel, further stabilizing an image formed on a display panel of the liquid crystal display device.

Figure 6A:
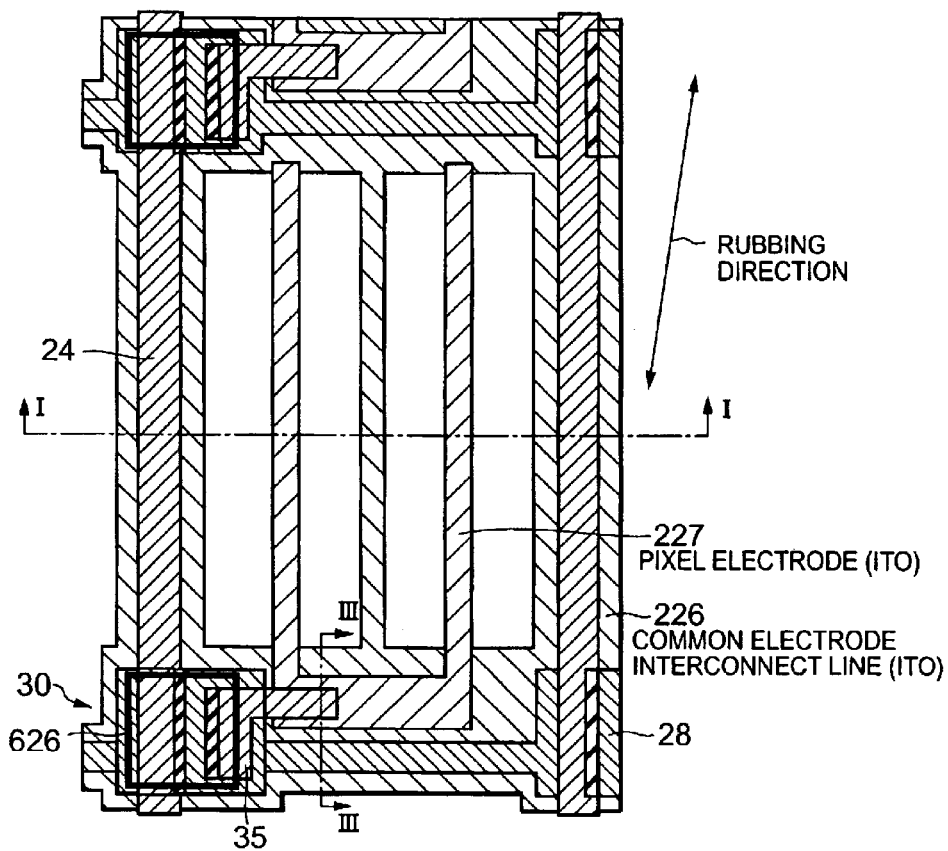
FIG. 6A is a plan view of a liquid crystal display device of the third modification example of the first embodiment of the present invention.
Figure 6B:
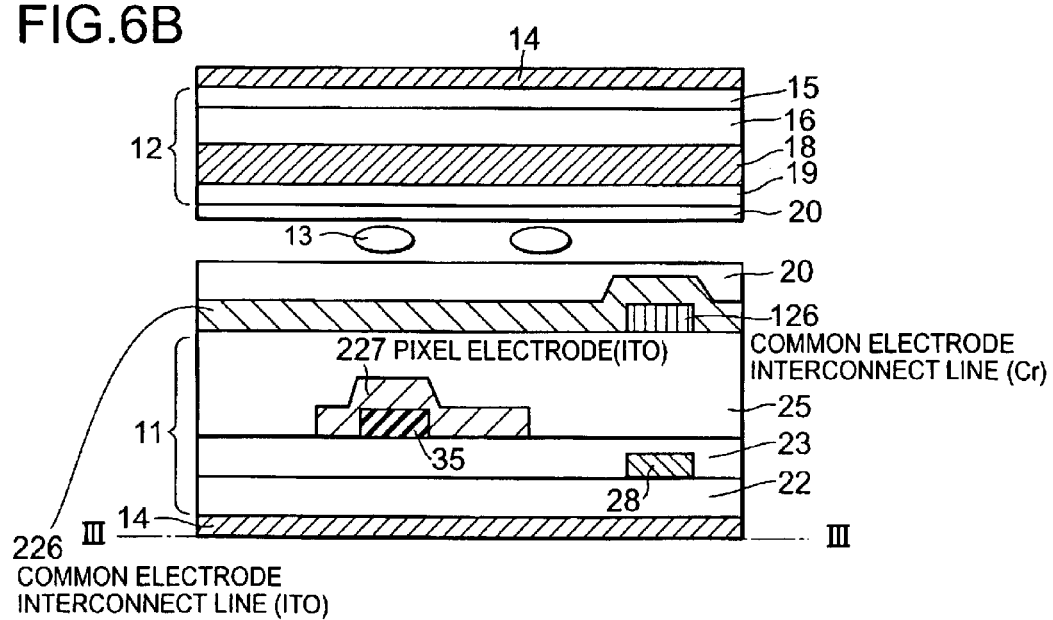
FIG. 6B is a cross sectional view taken along the line III—III shown in FIG. 6A.

Moreover, FIGS. 6A and 6B illustrate a third modification example of the embodiment shown in FIGS. 1A and 1B. FIG. 6A is a plan view of a liquid crystal display device of the third modification example and FIG. 6B is a cross sectional view taken along the line III—III shown in FIG. 6A. As shown in FIG. 6B, in order to reduce resistance of the common electrode interconnect line 26, it is preferable to couple a common electrode interconnect line 126 made of a low resistance material such as Cr to the common electrode interconnect line 26, forming a laminated structure. Note that to prevent decrease in the aperture ratio of the device, the common electrode interconnect line 126 is made to geometrically overlap the scanning line 28 and preferably, is positioned inside the scanning line 28 (although the entire common electrode interconnect line 126 made of an opaque material is not shown in the plan view of FIG. 6A, only a portion thereof covering an active region of the TFT 30 is indicated as a heavy black line 626).

Since the common electrode interconnect line 126 made of a low resistance material is opaque, a black matrix needs not to be formed in a display area of the opposing substrate 12. For this reason, even in a case where relative displacement between the active matrix substrate 11 and the opposing substrate 12 occurs when the two substrates are bonded together, the black matrix never overflows into the display area, preventing decrease in the aperture ratio of the device.

Figure 7A:
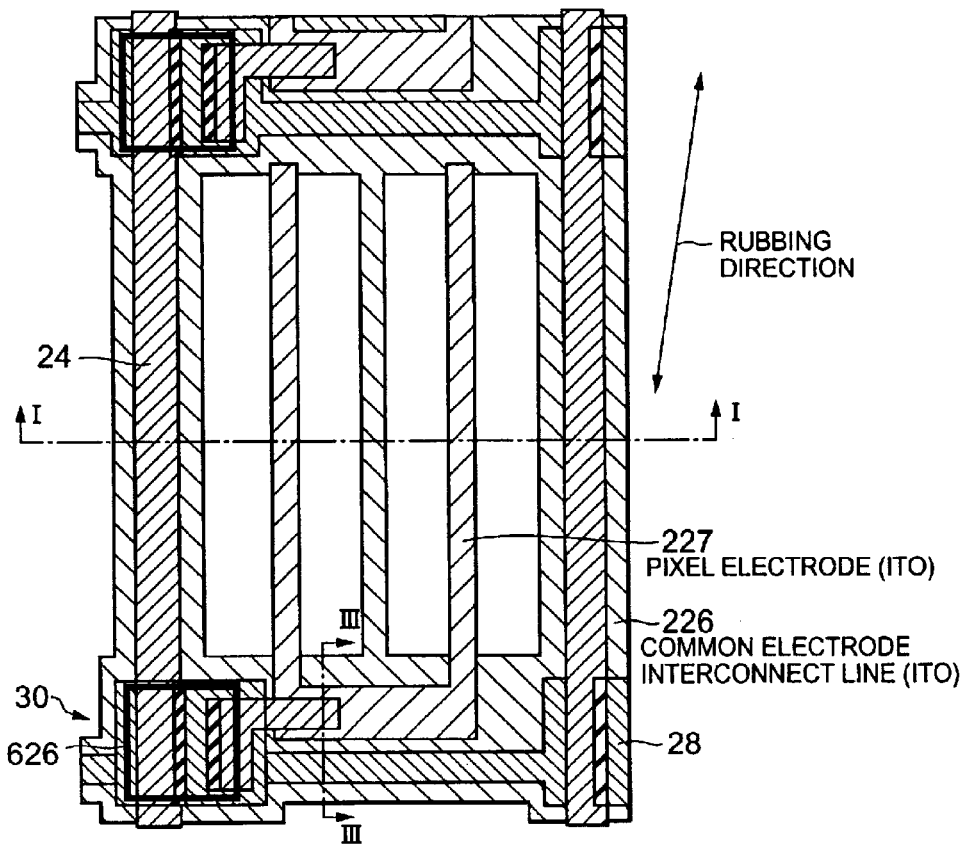
FIG. 7A is a plan view of a liquid crystal display device of the second modification example of the first embodiment of the present invention.
Figure 7B:
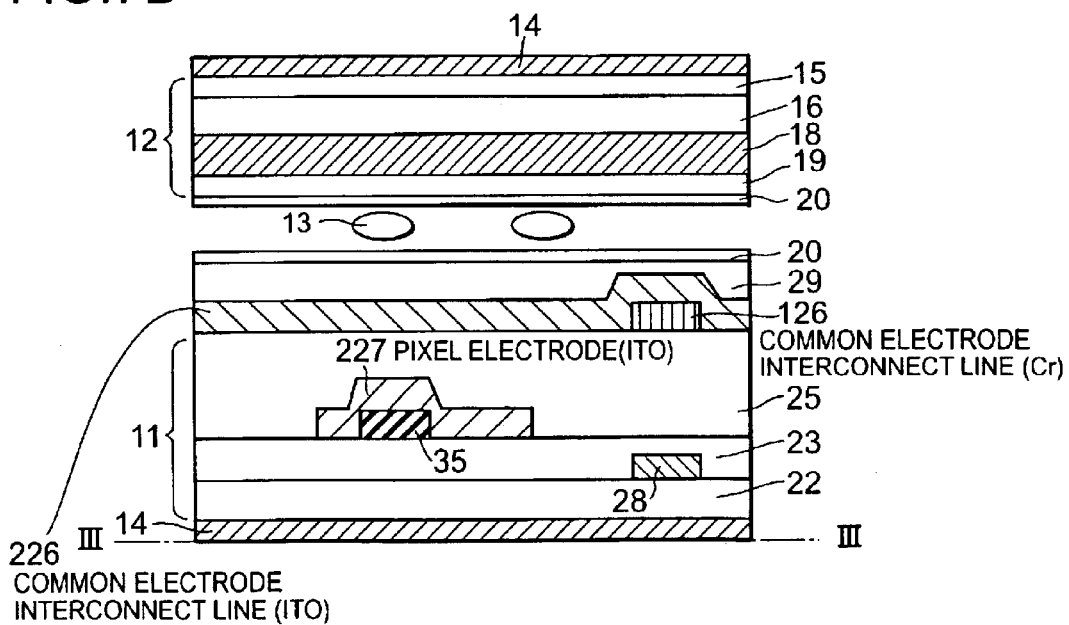
FIG. 7B is a cross sectional view taken along the line III—III shown in FIG. 7A.

Additionally, FIGS. 7A and 7B illustrate a fourth modification example of the embodiment shown in FIGS. 1A and 1B. FIG. 7A is a plan view of a liquid crystal display device of the fourth modification example and FIG. 7B is a cross sectional view taken along the line III—III shown in FIG. 7A. As shown in FIG. 7B, when a common electrode interconnect line is comprised of a common electrode interconnect line 126 and a common electrode interconnect line 226, both lines forming a laminated structure (although the entire common electrode interconnect line 126 made of an opaque material is not shown in the plan view of FIG. 7A, only a portion thereof covering an active region of the TFT 30 is indicated as a heavy black line 626), it is preferable to cover the common electrode interconnect lines 126, 226 with an insulation film 29.

The common electrode interconnect line 226 made of a transparent material is formed of ITO, etc., and an oxide film such as ITO is generally used in a TN LCD and is a very stable material as is known to those skilled in the art. However, when an ITO film has a defective portion therein due to a pinhole and cannot completely cover a film directly located thereunder, only an alignment film 20 comes to cover the common electrode interconnect line 126 made of chromium, i.e., an opaque material, serving as a protection film for preventing Cr from infiltrating into a liquid crystal layer. Therefore, in order to further improve reliability of liquid crystal panel, it is preferable to form the insulation film on the common electrode interconnect lines 126, 226.

Figure 8A:
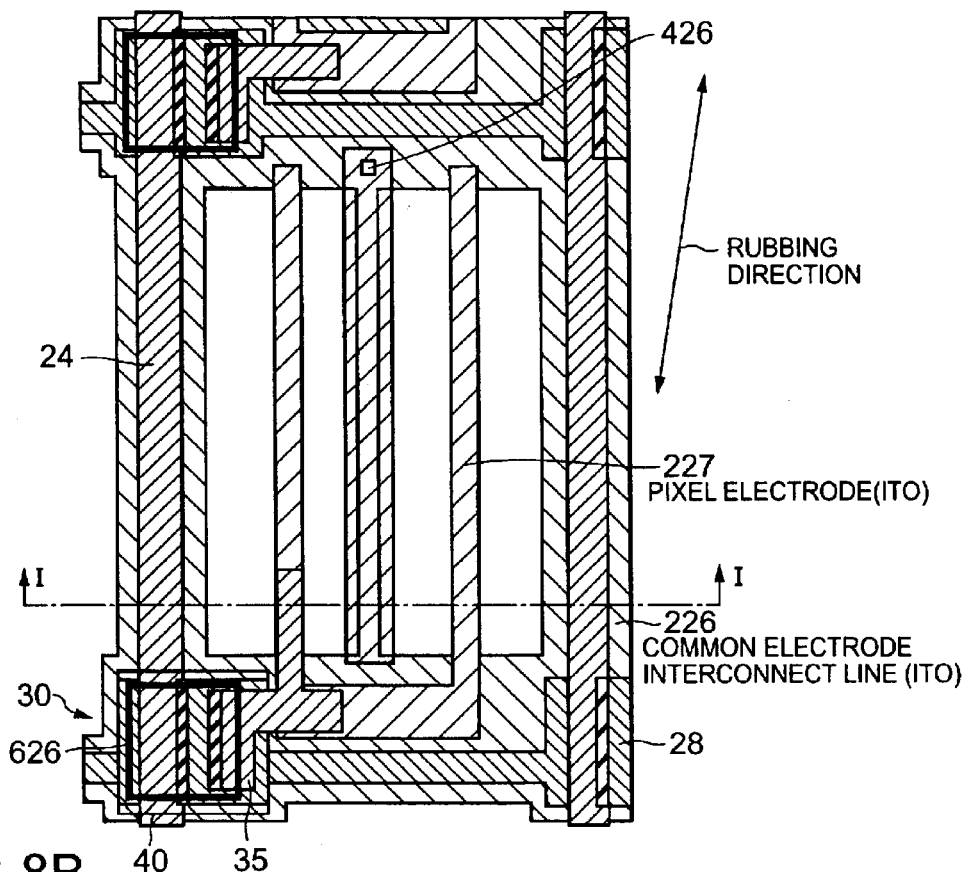
FIG. 8A is a plan view of a liquid crystal display device of the second modification example of the fifth embodiment of the present invention.
Figure 8B:
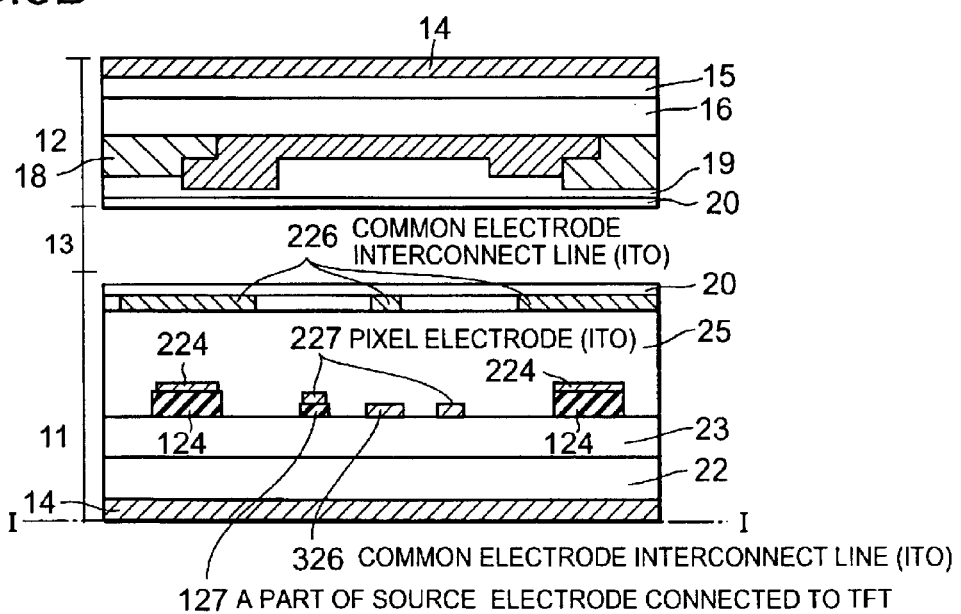
FIG. 8B is a cross sectional view taken along the line I—I shown in FIG. 8A.

FIGS. 8A and 8B illustrate a fifth modification example of the embodiment shown in FIGS. 1A and 1B. FIG. 8A is a plan view of a liquid crystal display device of the fourth modification example and FIG. 8B is a cross sectional view taken along the line I—I shown in FIG. 8A. Although in the first embodiment shown in FIG. 1B, the common electrode interconnect lines 226 made of a transparent material is formed only on the second interlayer insulation film 25, in the fifth modification example shown in FIG. 8B, the common electrode interconnect line made of a transparent material is comprised of the common electrode interconnect line 226 formed on the second interlayer insulation film 25 and also the common electrode interconnect line 326 formed at the same level as the second metal film. That is, as shown in FIG. 8B, the pixel electrode made of a transparent material has two pixel electrodes 227 and the common electrode interconnect line 326 made of a transparent material is formed therebetween. Thus, the common electrode interconnect line 26 is comprised of two interconnect lines, i.e., the common electrode interconnect lines 226 and 326 interposing the interlayer insulation film 25 therebetween. The configuration of common electrode interconnect line makes a distance between the pixel electrode and the common electrode interconnect line substantially shorter, enlarging an electric field therebetween. Accordingly, a voltage difference between the pixel electrode and the common electrode interconnect line can be made substantially smaller to generate the same strength of electric field.

Figure 9A:
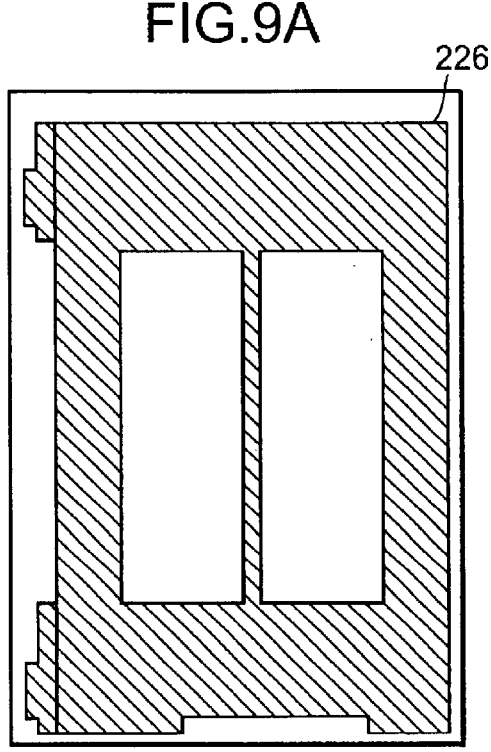
FIG. 9A illustrates a transparent film formed in the uppermost level of the interconnect shown in FIG. 8A.
Figure 9B:
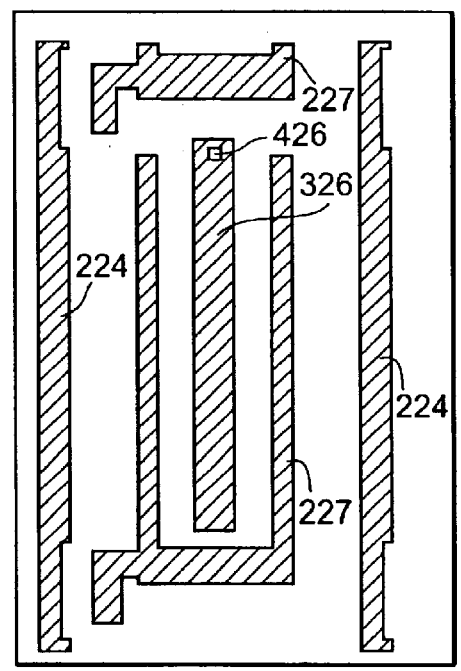
FIG. 9B illustrates a transparent film formed below the uppermost level of interconnect.
Figure 9C:
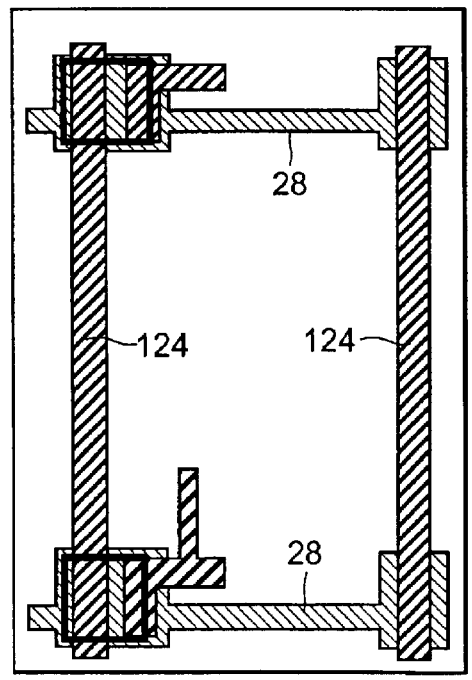
FIG. 9C illustrates conductive films other than shown in FIGS. 9A, 9B.

FIGS. 9A to 9C are plan views produced by dividing the plan view of FIG. 8A into three categories: (1) a transparent (ITO) film formed in the uppermost level of interconnect and constituting the common electrode interconnect line 226 (FIG. 9A); (2) a transparent (ITO) film constituting the pixel electrode 227 and the transparent film 224 formed on the data line 124, both being formed at the same level as the second metal film (FIG. 9B); (3) and other films including the first metal film constituting the scanning line 28 and the second metal film constituting the opaque film 124 (FIG. 9C). The common electrode interconnect lines 226 and 326 are connected via a contact hole.

Although the liquid crystal display device constructed as described above has its effective aperture ratio reduces its value corresponding to the area occupied by the contact hole, it can drive liquid crystal at lower voltage and reduce power consumption. The reason why effective aperture ratio of the device decreases is that when the device is in an IPS operation mode, since a lateral electric field is not effectively formed directly above the electrode, liquid crystal molecules above the electrode are not made to rotate, preventing transmittance of light transmitting though the liquid crystal molecules from becoming large. Note that in this case, the liquid crystal molecules allows light to be transmitted therethrough a little bit and therefore, the term "aperture ratio" means an effective aperture ratio that is calculated in a form including light transmitting through a transparent electrode. Forming a contact hole increases the area of electrode and lowers the effective aperture ratio of the device in proportion to reduction of the area to which a lateral electric field is applied.

Figure 11:
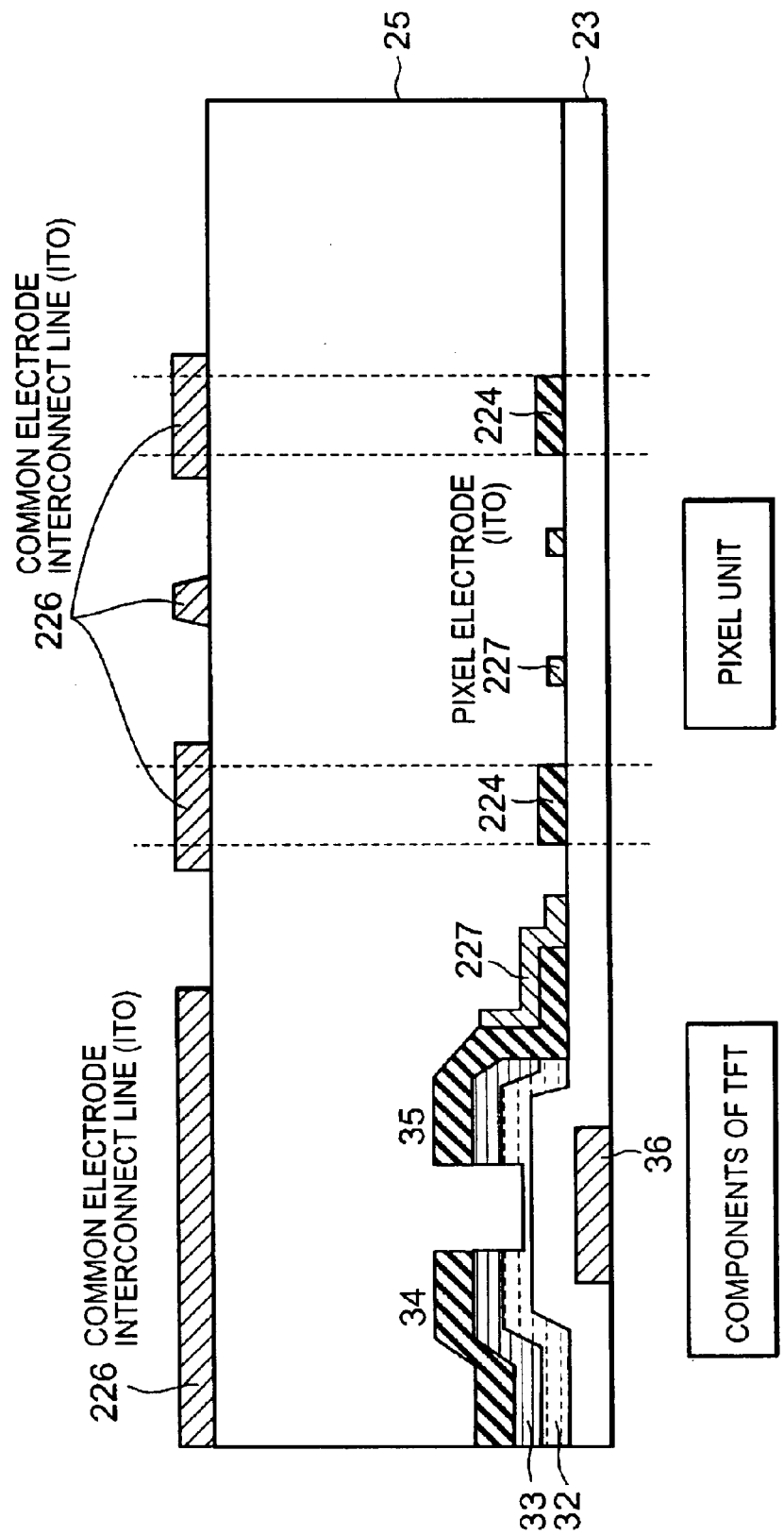
FIG. 11 is a cross sectional view taken along the lines I—I, II—II shown in FIG. 1A and corresponds to the case where the data line consists of a single chromium film, and the common electrode interconnect line consists of a single ITO film.

FIGS. 10 and 11 are diagrams, each illustrating together components of a TFT and components of a pixel excluding the components of a TFT according to the first embodiment in one drawing. FIGS. 10 and 11 are cross sectional views, taken along the line I—I and II—II, respectively.

FIG. 10 corresponds to the case where the common electrode interconnect line 26 and the data line 24 have a laminated structure consisting of an opaque film and a transparent film, and FIG. 11 corresponds to the case where and the data line 24 consist of a single film, i.e., the common electrode interconnect line 26 consists only of the transparent film 226 and the data line 24 consists only of the opaque film 124. Beneficial effects produced by the configurations shown in FIGS. 10 and 11 will be later described in detail and the following explanation will be made essentially referring to FIG. 10.

As shown in FIGS. 1A, 1B and FIG. 10, the scanning line 28 and the gate electrode 36 are made from the first metal film formed in the first level of interconnect.

The IPS liquid crystal display device 10 operates such that a scanning signal is supplied to a gate electrode via the scanning line 28 to select a pixel and a data signal is written to a pixel electrode via the data line, and an electric field parallel to the first and second transparent insulation substrates 22, 16 is generated between the common electrode interconnect line 26 and the pixel electrode 27, and then, liquid crystal molecules are made to rotate by the electric field in a plane parallel the transparent insulation substrates 22, 16 in order to display an specific image. In FIG. 1A, a longitudinal area enclosed by the common electrode interconnect line 226 and the pixel electrode 227, both being made of a transparent material, is called "column."

The components associated with the TFT shown in FIG. 10 are constructed such that the common electrode interconnect line 126 made of chromium is formed to geometrically overlap the gate electrode 36, shielding the gate electrode from light incident on the TFT and emitted from the side of the second transparent insulation substrate 16. This further enhances the reliability of the TFT. Furthermore, forming the common electrode interconnect line having a laminated structure consisting of the opaque film 126 and the transparent film 226, both being bonded together, reduces the resistance of interconnect line and enhances the stability of potential of the common electrode. Moreover, making the common electrode interconnect line 126 made of chromium geometrically overlap the gate electrode increases the aperture ratio of the device.

Figure 12:
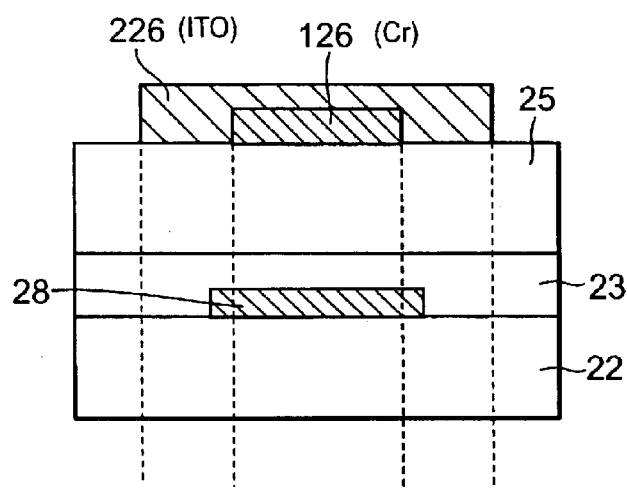
FIG. 12 a cross sectional view of the common electrode interconnect line and the scanning line according to the first embodiment of the present invention.

Although a geometrical relationship between the common electrode interconnect line and the gate electrode is described in conjunction with the TFT referring to FIG. 10, the geometrical relationship can also be applied to geometrical relationship between the scanning line 28 and the common electrode interconnect line 26 geometrically covering the scanning line 28. FIG. 12 illustrates an example configured to have a laminated structure consisting of the opaque film 126 made of chromium and the transparent film 226, both constituting the common electrode interconnect line 26 and being bonded together, and geometrically cover the scanning line 28 with the common electrode interconnect line 26. The opaque film 126 is formed to have a width smaller than that of the scanning line 28 in order to make the scanning line 28 geometrically cover the opaque film 126. This increases the aperture ratio of the device and reduces the resistance of the common electrode interconnect line 26, preventing a data signal from being delayed.

Although FIG. 12 illustrates the case where the common electrode interconnect line 26 geometrically covers the scanning line, the common electrode interconnect line 26 geometrically covering the data line 24 can also be configured to have the same structure as that employed in the case shown in FIG. 12. In the case where the common electrode interconnect line 26 geometrically covers the data line 24, employing the common electrode interconnect line 126 made of an opaque material as a light shielding film reduces the area of a black matrix of the opposing substrate and removes the black matrix from the opposing substrate while producing the same beneficial effects as those produced by the configuration shown in FIG. 12.

As shown in FIG. 12, the transparent film 226 made of ITO is disposed nearer the liquid crystal layer 13 than the opaque film 126 and the opaque film 126 is completely covered with the transparent film 226. This prevents the opaque film from reacting with the liquid crystal and dissolving into the liquid crystal, improving the device reliability. This is because ITO is a material that exhibits extreme stability against electrical chemical reaction. Note that when the opaque film 126 is formed of a material that exhibits higher stability against electrical chemical reaction than ITO, it is preferable to dispose the opaque film 126 nearer the liquid crystal layer 13 than the transparent film 226 and further cover the transparent film 226 with the opaque film 126.

As shown in FIG. 10, the thin film transistor 30 includes the gate electrode 36, the drain electrode 34 and the source electrode 35, and is disposed corresponding to each pixel at around a cross point at which the scanning line 28 and the data line 24 cross one another. The gate electrode 36 is electrically connected to the scanning line 28 and the drain electrode 34 is connected to the data line 24, and the source electrode 35 is connected to the pixel electrode 227.

As shown in FIG. 10, the source electrode 35 of the TFT 30 consists of an opaque film 135 made from the second metal film, which also constitutes the data line, and a transparent film 235 made of ITO, which also constitutes the pixel electrode 227, and formed at the same level as the pixel electrode 227, both films being bonded together to form a laminated structure. Forming the transparent film 234 of the drain electrode 34 and the transparent film 235 of the source electrode 35 at the same level as the transparent film 224 of the data line 24 prevents increase in the number of process steps of forming a TFT.

Additionally, the transparent films 234, 235 are geometrically covered with THE opaque films 134, 135, respectively, the lengths of which are longer than that of the transparent films 234, 235 in a direction parallel to the channel of TFT. That is, as shown in FIG. 10, the opaque films 134, 135 are formed to have their ends aligned in line with the ends of the opening corresponding to the channel and the transparent films 234, 235 are formed to have their ends apart 0.5 to 1.0 micrometers from the ends of the opening corresponding to the channel. The construction of those films prevents variations in characteristics of TFT due to the accuracy with which the transparent film is patterned since the length of the channel of TFT is determined by patterns of the opaque films, which patterns affect the characteristics of TFT. Furthermore, when the transparent film is formed on the opaque film so that both films are bonded to each other and a difference between the widths of patterns of the transparent film and the opaque film becomes large, the opaque film and the transparent film disappear in some cases in the step of etching films to form the respective patterns in the films, as described above. To prevent the phenomenon and increase the yield of the device, it is preferable to form the transparent films 234, 235 so that the lengths of the films 234, 235 are determined shorter by 0.5 to 1.0 micrometers than those of the opaque films 134, 135 in a direction parallel to the channel of TFT.

The components of TFT of the liquid crystal display device 10 according to the first embodiment shown in FIG. 10 are constructed such that the common electrode interconnect line 226 geometrically covering the components of TFT is made only of a transparent film (ITO) as a single film and the drain electrode 34 and the source electrode 35 are made from the second metal film as a single film. Moreover, in the pixel shown in FIG. 11, the data line 24 is made only of the opaque film 124 as a single film. The remaining construction of the liquid crystal display device shown in FIG. 11 is the same as that of the liquid crystal display device shown in FIG. 10.

A method for manufacturing the components of TFT and the pixel shown in FIG. 10 will be briefly explained below.

A gate electrode 36 and a scanning line 28, both being made from a first metal film such as chromium, are formed on a glass substrate as a first transparent insulation substrate 22 by a lithography technique and dry etching.

Then, a first interlayer insulation film 23 made of silicon dioxide ($SiO_2$) and silicon nitride ($SiNx$) is formed over the transparent insulation substrate 22 so as to cover the gate electrode 36 and the scanning line 28.

Subsequently, an amorphous silicon film having a laminated structure consisting of an amorphous silicon (a-Si) film 32 and an n+ amorphous silicon (a-Si) film 33 is formed over the first interlayer insulation film 23.

Thereafter, the amorphous silicon films 32, 33 are etched and patterned by a lithography technique and dry etching to form a island-shaped semiconductor layer.

Then, chromium as a second metal film is deposited over the surface of the substrate and patterned by a lithography technique and dry etching, forming an opaque film 134 of a drain electrode 34 of TFT, an opaque film 135 of a source electrode 35 of TFT and an opaque film 124 of a data line 24.

Subsequently, ITO is deposited over the surface of the substrate and patterned by a lithography technique and dry etching, forming a transparent film 234 of the drain electrode 34, a transparent film 235 of the source electrode 35, a transparent film 224 of the data line 24 and a transparent film 227 of a pixel electrode 27.

After forming a pattern in ITO, a channel of TFT is formed by etching. That is, a portion of the amorphous silicon film consisting of the n+ a-Si film 33 and the a-Si film 32, which portion is exposed to the outside through an opening formed between the drain electrode 34 and the source electrode 35, is etched using the drain electrode 34 and the source electrode 35 as a mask to an intermediate depth from the surface of the amorphous silicon film, forming the channel of a TFT 30.

Then, a second interlayer insulation film 25 made of silicon nitride as an inorganic material is deposited over the surface of the substrate.

Chromium is patterned by a lithography technique and dry etching to form a common electrode interconnect line 126 approximately positioned in the same geometrical location as that of the gate electrode 36. In this case, preferably, the common electrode interconnect line 126 made of chromium is geometrically covered with the gate electrode 36, the area of which is larger than that of the common electrode interconnect line. This is because only the gate electrode 36 determines the aperture ratio of the device and the common electrode interconnect line 126 never affects, i.e., decreases the aperture ratio of the device.

ITO is deposited over the surface of the substrate and patterned by a lithography technique and dry etching, forming common electrode interconnect lines 226 made of ITO within a pixel region and a TFT region, respectively.

Explanation of how the liquid crystal display device shown in FIG. 11 is manufactured is omitted since a difference between the configurations of the devices shown in FIGS. 10, 11 is only that the device shown in FIG. 11 does not include the data line made of ITO and the common electrode interconnect line 126 made of chromium.

[Second Embodiment of the Invention]

Figure 13:
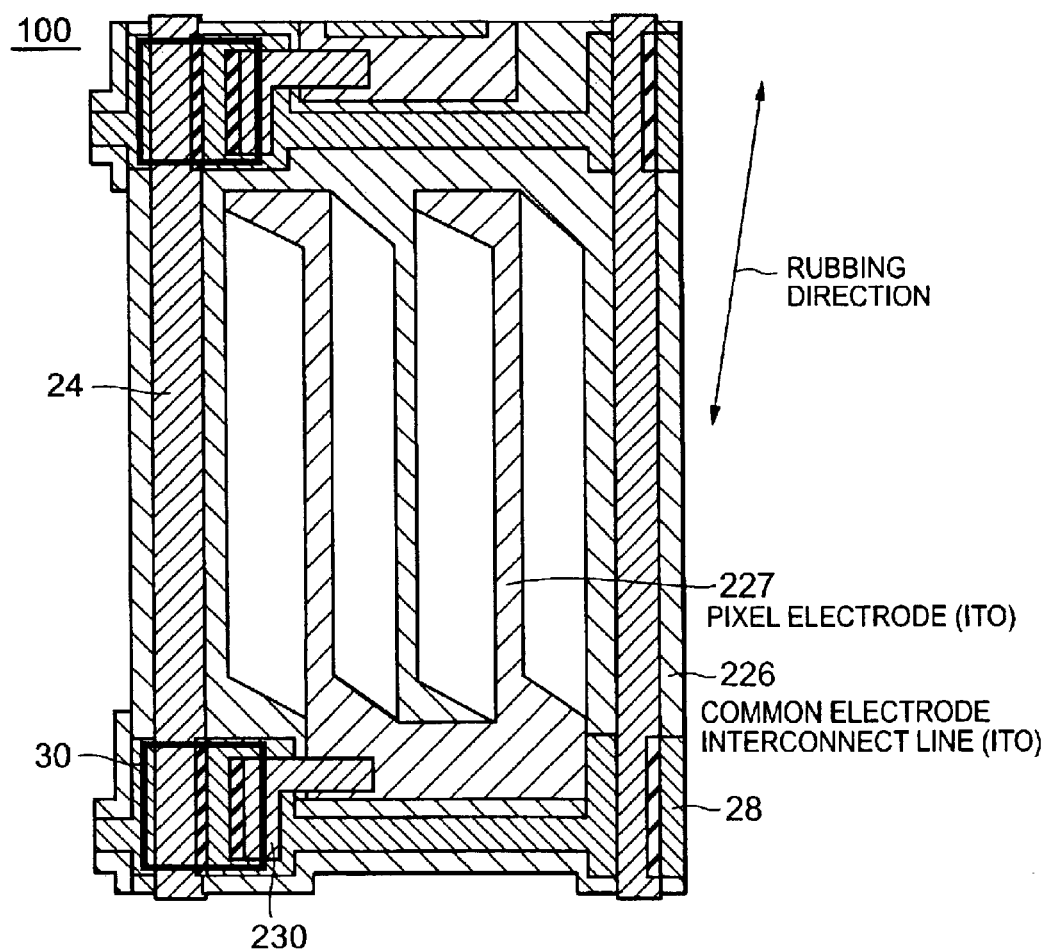
FIG. 13 is a plan view of a liquid crystal display device according to the second embodiment of the present invention.

FIG. 13 illustrates an active matrix liquid crystal display device 100 according to a second embodiment of the present invention. Note that a relationship between an initial alignment direction (a direction in which rubbing is performed, i.e., a rubbing direction) of liquid crystal molecule, which direction is determined by a rubbing direction, and a direction in which an electric field is applied between the pixel electrode 27 and the common electrode interconnect line 26 is determined as follows. That is, when a voltage is applied between the pixel electrode 27 and the common electrode interconnect line 26, each of liquid crystal molecules is made to rotate clockwise by an acute angle from its initial alignment direction over the entire display regions enclosed by the pixel electrode 27 and the common electrode interconnect line 26, in order to make the alignment direction of the each of liquid crystal molecules coincide with the direction of the electric field. To produce the above-stated relationship therebetween, the upper and lower end sides of the pixel electrode 27 and the common electrode interconnect line 26 in each column when viewing the paper from a direction vertical to the paper are formed inclined as shown in FIG. 13.

Figure 14:
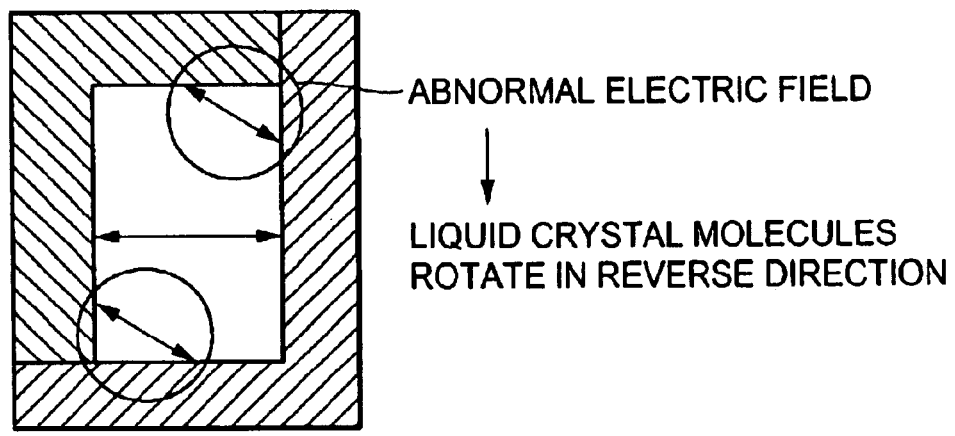
FIG. 14 is an illustrative view explaining how a disclination is formed in the liquid crystal display device shown in FIG. 1A.

As shown in FIG. 14, when a voltage is applied between the pixel electrode 27 and the common electrode interconnect line 26, and a region in which each of liquid crystal molecules is made to rotate counterclockwise from its initial alignment direction to the direction of an electric field exists, a domain in which each of liquid crystal molecules is made to rotate in a direction reverse to a desired direction in which liquid crystal molecules in each column should rotate would be generated in the end portions of a pixel. In more detail, assuming that a rubbing direction is defined as that shown in FIG. 13 and an electric field denoted by "an abnormal electric field" of FIG. 14 is applied to liquid crystal molecules, each of the liquid crystal molecules is made to rotate an acute angle in order to make the alignment direction of the each of the liquid crystal molecules coincide with the direction of the abnormal electric field. As a result, the each of the liquid crystal molecules is made to rotate counterclockwise. In contrast, each of liquid crystal molecules to which a normal lateral electric field is applied is made to rotate an acute angle in order to make the alignment direction of the each of the liquid crystal molecules coincide with the direction of the normal lateral electric field. As described above, when the direction of an electric field becomes different depending on a region in which liquid crystal molecules are positioned, corresponding liquid crystal molecules in a region around a boundary between the regions corresponding to the normal electric field and the abnormal electric field are made to rotate in directions reverse to one another, forming a disclination at the boundary between the corresponding liquid crystal molecules. In general, when liquid crystal molecules are made to rotate in a direction reverse to a normal direction in a certain region within a pixel, a disclination is formed in a region at a boundary between the domains in which liquid crystal molecules are made to rotate in a normal direction and another liquid crystal molecules are made to rotate in an abnormal direction reverse to the normal direction. When the disclination is being fixedly formed for a long period of time, display conditions change correspondingly and the same display as that at the initial stage of operation of the device is not probably obtained, lowering the reliability of the device. Additionally, since the common electrode interconnect line 26 and the pixel electrode 27 are made from a transparent film, a disclination easily becomes apparent to a viewer.

As shown in FIG. 13, forming the common electrode interconnect line 26 and the pixel electrode 27 so that those components have inclined end sides as upper and lower sides prevents such reverse rotation of liquid crystal molecules. A structure constructed by forming the common electrode interconnect line 26 and the pixel electrode 27 so that those components have inclined end sides as upper and lower sides and liquid crystal molecules are made to rotate in a fixed direction is referred to as an anti-reverse-rotation structure.

Figure 15A:
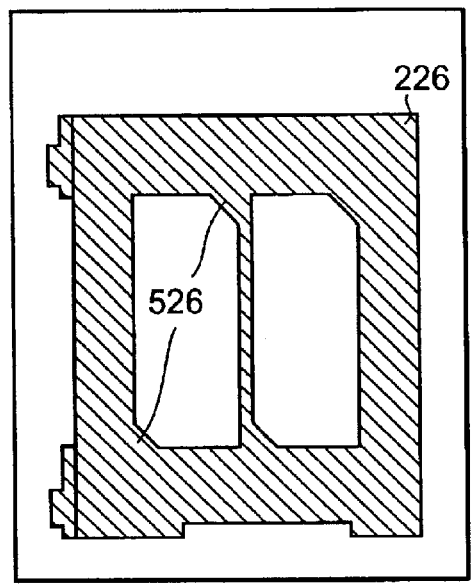
FIG. 15A illustrates a transparent film formed in the uppermost level of interconnect shown in FIG. 13.
Figure 15B:
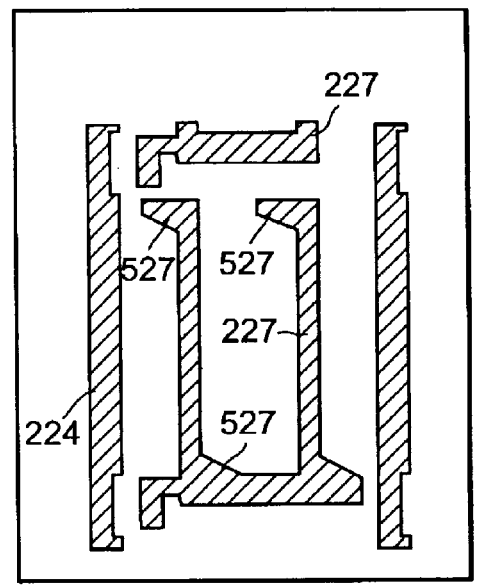
FIG. 15B illustrates a transparent film formed below the uppermost level of interconnect.
Figure 15C:
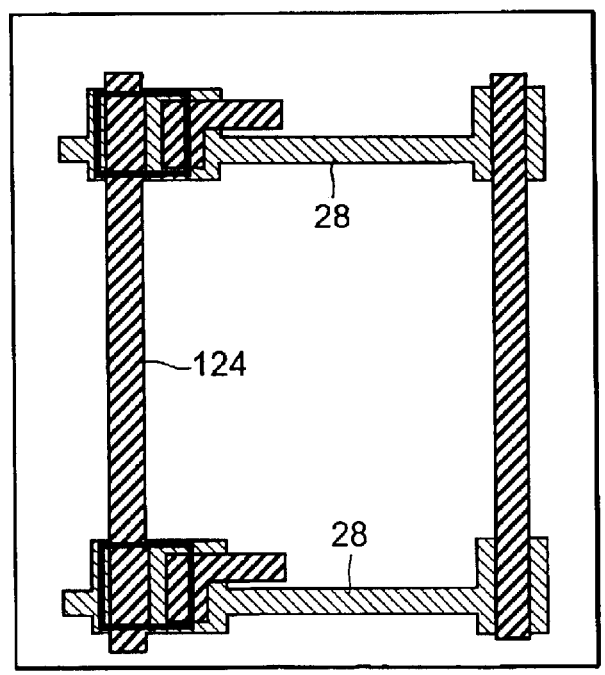
FIG. 15C illustrates conductive films other than shown in FIGS. 15A, 15B.

The level arrangement of the anti-reverse-rotation structure will be explained with reference to FIGS. 15A to 15C. FIGS. 15A to 15C are plan views produced by dividing the plan view of FIG. 13 into three categories: (1) a transparent (ITO) film formed in the uppermost level of interconnect and constituting the common electrode interconnect line 226 (FIG. 15A); (2) a transparent (ITO) film constituting the pixel electrode 227 and the transparent film 224 of the data line 24, both being formed at the same level as the second metal film (FIG. 15B); (3) and other films including the first metal film constituting the scanning line 28 and the second metal film constituting the opaque film 124 of the data line 24 (FIG. 15C). The pixel electrode 227 made from a transparent film and formed at the same level as the second metal film, and the common electrode interconnect line 226 made of ITO and formed on the second interlayer insulation film each are made to have comb-shaped electrodes, and the comb-shaped electrodes corresponding to the common electrode interconnect line 226 and the pixel electrode 227 each have inclined end sides 526, 527 as upper and lower sides, respectively, thereby forming the anti-reverse-rotation structure in which liquid crystal molecules are made to rotate in a fixed direction. Thus, the major axis of the liquid crystal molecule of the device can be prevented from rotating in the reverse direction, preventing formation of disclination and increasing optical transmittance and reliability of the liquid crystal display device 100.

[Third Embodiment of the Invention]

Figure 16:
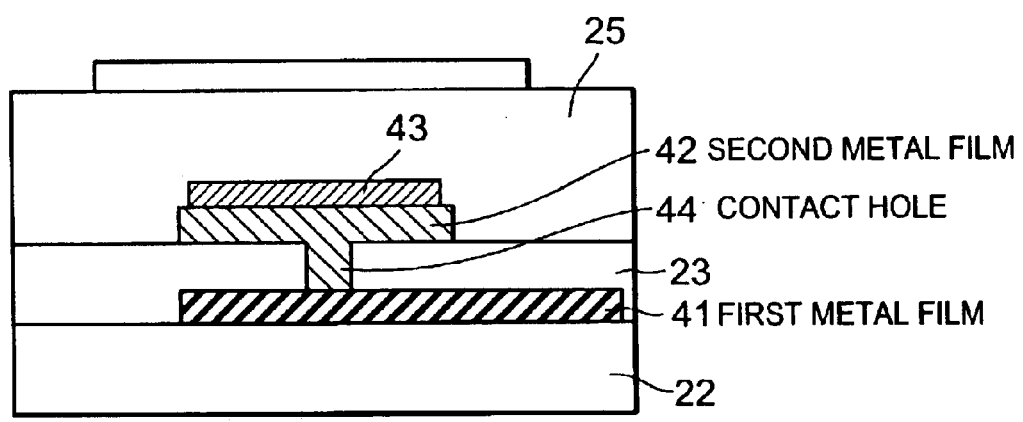
FIG. 16 is an illustrative cross sectional view explaining how the periphery of the liquid crystal panel of the device is constructed.

FIG. 16 illustrates how the periphery of the liquid crystal panel of the device is constructed. As shown in FIG. 16, the scanning line 28 made from the first metal film 41 is disposed at the periphery of the panel and is electrically connected to the second metal film 42 via a contact hole 44. The construction of the first and second metal films makes it possible to prevent disappearance of electrode due to the above-described cell reaction that is observed when ITO is wet-etched (forming the pattern of the pixel electrode 227) after formation of pattern of the data line 24, increasing the yield of the device.

As described so far, according to the liquid crystal display device of the present invention, the specific items and other items associated therewith described in the chapter "problems to be solved by the invention" can be solved, producing beneficial effects as follows.

(1) An IPS liquid crystal display device is able to prevent decrease in the aperture ratio of the device and occurrence of longitudinal cross-talk due to an electric field leakage from a boundary between pixels to a display region.

(2) The IPS liquid crystal display device configured to have the common electrode made of a transparent material geometrically cover the data line is able to reduce the value of resistance of the common electrode.

(3) The IPS liquid crystal display device is able to reduce the area of a black matrix or eliminate the black matrix in order to increase the aperture ratio of the device, which black matrix has been employed in the conventional technique to prevent longitudinal cross-talk from appearing in an image to be displayed.

(4) The IPS liquid crystal display device is able to include a transparent electrode manufactured at a lower cost.

(5) The IPS liquid crystal display device is configured to have the common electrode made of a transparent material geometrically and completely cover the data line without increasing parasitic capacitance between the common electrode interconnect line and the data line.

(6) The IPS liquid crystal display device is configured to have a highly reliable transparent material for preventing electric field leakage from the data line.

What is claimed is:

1. An in-plane switching mode liquid crystal display device comprising:

a first substrate having a scanning line, a data line and a common electrode interconnect line formed thereon, said data line being formed to cross said scanning line while interposing an insulation film between said data line and said scanning line, said common electrode interconnect line being constructed such that said common electrode interconnect line is located farther from said first substrate than said scanning line and said data line, and has a width greater than those of said scanning line and said data line in order to geometrically cover said scanning line and said data line, wherein said common electrode interconnect line includes a laminated structure comprising a transparent film and an opaque film, both being bonded to one another, and said opaque film is geometrically located inside said scanning line;

a second substrate disposed to face said first substrate; and a liquid crystal interposed between said first substrate and said second substrate.

2. The in-plane switching mode liquid crystal display device according to claim 1, wherein said transparent conductive film comprises Indium—Tin—Oxide (ITO).

3. The in-plane switching mode liquid crystal display device according to claim 1, wherein said opaque film is wider than said transparent film by a value in a range of approximately 1 to 2 micrometers.

4. The in-plane switching mode liquid crystal display device according to claim 1, wherein said common electrode interconnect line is covered by an insulating layer.

5. The in-plane switching mode liquid crystal display device according to claim 1, wherein said transparent film completely covers said opaque film to protect said opaque film from being dissolved by said liquid crystal.

6. The in-plane switching mode liquid crystal display device according to claim 1, further comprising:

a thin film transistor formed at an intersection of said data line and said scan line and said common electrode interconnect line is fanned such that a portion of said opaque film is aligned to cover a gate region of said thin film transistor.

* * * * *